March 24, 1936.    R. C. DATIN    2,034,693
PROCESS FOR HEATING MATERIALS
Filed April 20, 1933
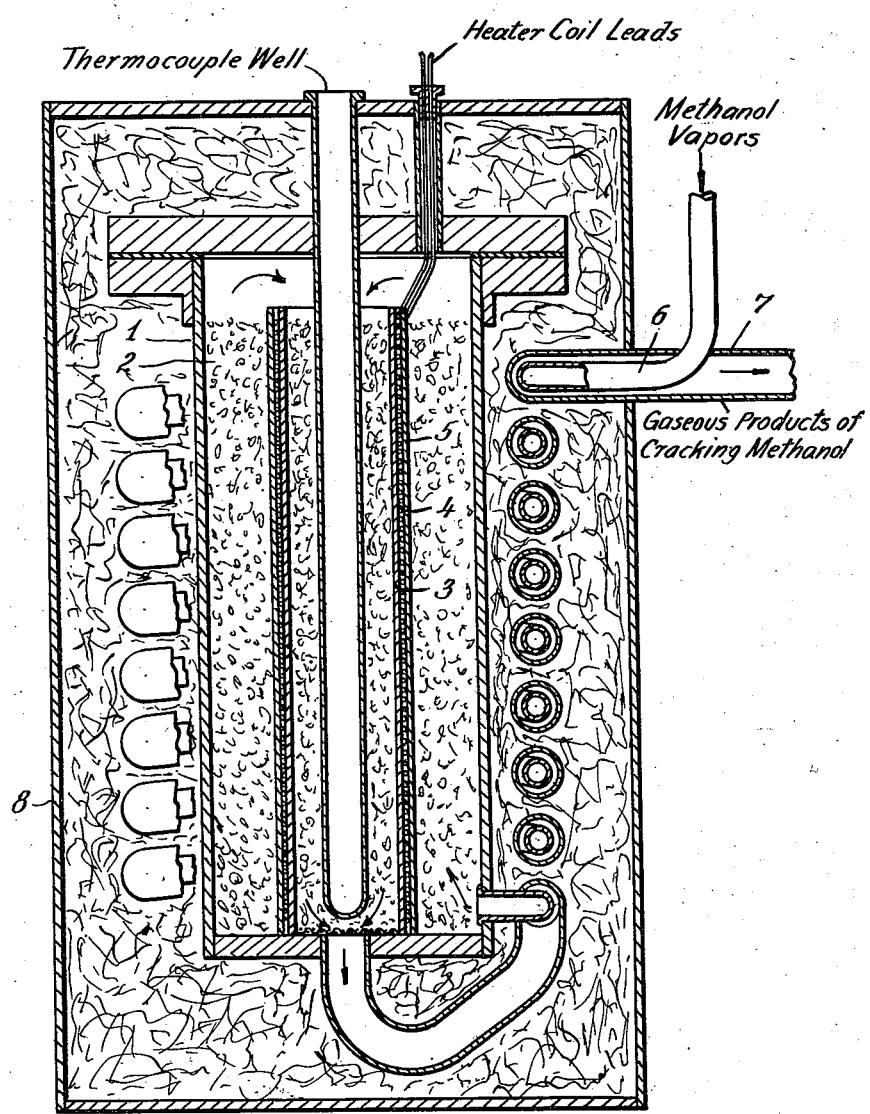
INVENTOR
RICHARD C. DATIN
BY
ATTORNEY Patented Mar. 24, 1936

2,034,693

UNITED STATES PATENT OFFICE 2,034,693

PROCESS FOR HEATING MATERIALS

Richard C. Datin, Syracuse, N. Y., assignor to Atmospheric Nitrogen Corporation, New York, N. Y., a corporation of New York Application April 20, 1933, Serial No. 667,053

2 Claims. (Cl. 148—9)

This invention relates to a method of producing a zone of high temperature by the combustion of the decomposition products obtained by cracking methanol. More particularly, this invention relates to a process for the cutting, brazing or welding of metals employing a flame comprising the combustion products of oxygen and the decomposition products obtained by cracking methanol.

In accordance with this invention methanol vapors are cracked either in the presence or in the absence of a catalyst and the products of this decomposition are burned with oxygen or air to produce the high temperatures such as are required for welding or cutting metals. The methanol is advantageous as a source of combustible gas since it is a liquid at ordinary temperatures and pressures, in which form it is conveniently transported and handled, yet due to its relatively low boiling and heat of vaporization, it may be readily vaporized. Despite the conveniences in transporting and handling methanol, it cannot be directly used in a heating torch, since such torches are not adapted to handle a liquid fuel. By cracking the methanol in accordance with this invention, a mixture of permanent gases may be prepared which are a suitable fuel for supply to a torch. Furthermore, the flame temperature obtained by burning the products of cracking methanol is materially higher than the flame temperature obtained by burning methanol itself either supplied as the liquid or as vapors of methanol at temperatures somewhat above the boiling point of methanol.

In carrying out the process of this invention vapors of methanol may be heated to a temperature sufficiently high to crack the methanol to form carbon monoxide and hydrogen, preferably while passing the vapors in contact with a catalyst active to promote the cracking of the methanol. The use of a catalyst, while preferable, is not necessary, but instead the methanol vapors may be heated sufficiently high to crack them without passing them over a catalyst. The decomposition products of the methanol and a gas containing free oxygen are mixed and ignited. The gases burn to give a flame having a very high temperature. The intensely hot burning jet of gases may be applied to metals to cut, weld or braze the metals. It is particularly of advantage in utilizing the flame for such purposes to burn the methanol decomposition products with substantially pure oxygen gas, thus obtaining a flame having a relatively high temperature. When the flame is used for purposes not requiring such an intense heat, however, a diluted oxygen gas, such as air, may be utilized.

A suitable apparatus for cracking methanol to provide the combustible gas of this invention is shown in the accompanying drawing. In the drawing, the numeral 1 indicates a container for a catalyst material 2, within which there is an alundum or porcelain cylinder 3 on which is wound an electrical heating element 4 covered by a protective coating of refractory cement 5. A heat exchanger consisting of two concentric pipes 6 and 7 coiled about vessel 1 communicates with the bottom of vessel 1 for conducting methanol vapors through the inner pipe 6 into the bottom of vessel 1 in the space between cylinder 3 and the outer wall of the vessel 1, and for conducting the gaseous products of cracking the methanol vapors from the bottom portion of vessel 1 within cylinder 3. With this arrangement of inlet and outlet to and from vessel 1 and cylinder 3, the entering methanol vapors pass upwardly between cylinder 3 and the walls of the vessel 1 and into the top of and downwardly through the interior of cylinder 3. Catalyst 2 is filled into vessel 1 both outside and inside the cylinder. The vessel and heat exchanger are enclosed in an outer shell 8 and the space about the vessel and heat exchanger is filled with a heat insulating material. Provision is made for connecting resistance coil 4 to a source of electrical current and a thermo-couple well penetrating the catalyst within cylinder 3 is provided for observation of the temperatures of the catalyst.

In employing the apparatus described for cracking methanol vapors in accordance with the process of this invention, methanol vapor is passed at the desired rate through the coil formed by pipe 6 and is heated by the heat of the gases passing through pipe 7. The heated vapors leaving the lower end of pipe 6 enter vessel 1 and pass therethrough in contact with the catalyst where they are further heated by heating element 4 to promote substantially complete cracking of the methanol. The gaseous products of cracking the methanol pass out of the vessel through pipe 7 and after giving up a portion of their heat content to the incoming methanol vapors, may be further cooled by means not shown and then discharged to storage or directly passed to a torch for burning the gases to give a high temperature flame. Numerous torches or burners suitable for combustion of these gaseous products are known to the art.

The catalyst employed in the apparatus described may be any material which suitably promotes the decomposition of methanol at elevated temperatures such as a catalytic composition containing zinc oxide and chromium oxide in about equal molecular proportions. Numerous catalytic materials suitable for carrying out this invention are known to the art.

While the flame of this invention is of particular value in the cutting, welding or brazing of metals, its use is not limited thereto, but it may be employed for other purposes where a high temperature flame is of value.

I claim:

1. The process of heating metal to cutting, brazing and welding temperatures which comprises bringing liquid methanol to the place where the heating of the metal is to be accomplished, cracking the methanol to obtain gaseous products therefrom, immediately feeding a jet of the said gaseous products and a gas containing oxygen to a flame of combustion of said gases and applying said flame to the metal.

2. The improvement in the method for maintaining a zone of high temperature employing methanol as the fuel for combustion, which comprises bringing liquid methanol to the place at which it is to be used as a fuel, cracking the methanol and then immediately jetting the gaseous products obtained by cracking the methanol into said zone in the presence of a gas containing oxygen.

RICHARD C. DATIN.